(12) United States Patent
Park et al.

(10) Patent No.: US 12,043,086 B2
(45) Date of Patent: Jul. 23, 2024

(54) AFTER-BLOW CONTROL METHOD OF VEHICLE AIR CONDITIONER

(71) Applicants: HYUNDAI MOTOR COMPANY, Seoul (KR); KIA MOTORS CORPORATION, Seoul (KR)

(72) Inventors: JiMin Park, Suwon-si (KR); Yongchul Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 152 days.

(21) Appl. No.: 17/174,578

(22) Filed: Feb. 12, 2021

(65) Prior Publication Data

US 2022/0048362 A1 Feb. 17, 2022

(30) Foreign Application Priority Data

Aug. 11, 2020 (KR) .................. 10-2020-0100673

(51) Int. Cl.
 *B60H 1/00* (2006.01)
(52) U.S. Cl.
 CPC ..... *B60H 1/00828* (2013.01); *B60H 1/00392* (2013.01); *B60H 1/00428* (2013.01); *B60H 1/008* (2013.01); *B60H 1/00807* (2013.01); *B60H 1/00978* (2013.01)
(58) Field of Classification Search
 CPC ............ B60H 1/00392; B60H 1/00428; B60H 1/008; B60H 1/00807; B60H 1/00828; B60H 1/00978; B60H 3/0085
See application file for complete search history.

(56) References Cited

U.S. PATENT DOCUMENTS

| 5,275,011 A | * | 1/1994 | Hanson | B60H 1/3208 |
| | | | | 62/157 |
| 5,899,082 A | * | 5/1999 | Stein | B60H 1/00828 |
| | | | | 62/282 |
| 2004/0194913 A1 | * | 10/2004 | Umebayashi | B60H 1/00692 |
| | | | | 165/204 |

(Continued)

FOREIGN PATENT DOCUMENTS

| JP | 2011068155 A | * | 4/2011 | ......... B60H 1/00778 |
| JP | 5287634 B2 | | 9/2013 | |

(Continued)

*Primary Examiner* — Edelmira Bosques
*Assistant Examiner* — Michael James Giordano
(74) *Attorney, Agent, or Firm* — Lempia Summerfield Katz LLC (57) ABSTRACT

An after-blow control method of a vehicle air conditioner includes: turning on after-blow function applied to the vehicle and turning off the vehicle start, determining, by the controller, whether a condition of the vehicle is satisfied, displaying an after-blower symbol after ignition is turned off if it is determined that the condition of the vehicle is satisfied, determining, by the controller, whether a preset first time has elapsed after the vehicle is turned off, operating the after-blow at a preset intensity for a second preset time and displaying the after-blower symbol if it is determined that the first preset time has elapsed after the vehicle is turned off, and terminating the after-blow function when the second preset time elapses or when the vehicle is turned on.

9 Claims, 8 Drawing Sheets

(56) References Cited

U.S. PATENT DOCUMENTS

| | | | | |
|---|---|---|---|---|
| 2011/0067422 A1* | 3/2011 | Ichishi | ................. | B60H 3/0085 |
| | | | | 62/176.1 |
| 2013/0145647 A1* | 6/2013 | Kim | .................... | B60H 3/0085 |
| | | | | 34/492 |
| 2015/0183291 A1* | 7/2015 | Higuchi | ............. | B60H 1/00849 |
| | | | | 62/133 |
| 2015/0375599 A1* | 12/2015 | Esposito | ............ | B60H 1/00778 |
| | | | | 701/36 |
| 2018/0304719 A1* | 10/2018 | Shen | .................... | B60H 3/0085 |
| 2018/0304820 A1* | 10/2018 | Johnson | ................... | B60R 21/16 |
| 2019/0381855 A1* | 12/2019 | Kim | .................. | B60H 1/00849 |

FOREIGN PATENT DOCUMENTS

| | | |
|---|---|---|
| KR | 10-2003-0032378 A | 4/2003 |
| KR | 100734806 B1 * | 7/2007 |
| KR | 10-2015-0096927 A | 8/2015 |

* cited by examiner

AFTER-BLOW CONTROL METHOD OF VEHICLE AIR CONDITIONER

CROSS-REFERENCE TO RELATED APPLICATION

This application claims priority to and the benefit of Korean Patent Application No. 10-2020-0100673, filed on Aug. 11, 2020, the entire contents of which are incorporated herein by reference.

FIELD

The present disclosure relates to an after-blow control method of vehicle air conditioner. More particularly, the present disclosure relates to an after-blow control method of vehicle air conditioner according to vehicle condition.

BACKGROUND

The statements in this section merely provide background information related to the present disclosure and may not constitute prior art.

In general, a vehicle is equipped with an air conditioner to increase the comfort and comfort of passengers in the vehicle while driving the vehicle and to promote safe operation. The passenger can properly maintain the temperature, humidity, and air environment in the vehicle by using an air conditioner according to changes in the surrounding environment.

The passenger can adjust the flow rate and temperature of the air discharged from the air conditioner, and change the direction in which the air is discharged, thereby creating a comfortable indoor environment.

By the way, condensed water is formed in the evaporator core of the air conditioner, which adheres to the surface of microorganisms to form mold, and for this reason, odor is generated when the air conditioner is operated. In order to solve this problem, research has been conducted to reduce odor by reducing the condensed water remaining in the air conditioner by operating the blower of the air conditioner to ventilate the vehicle interior after starting off.

The above information disclosed in this Background section is only for enhancement of understanding of the background of the present disclosure, and therefore it may contain information that does not form the prior art that is already known to a person of ordinary skill in the art.

SUMMARY

The present disclosure provides an after-blow control method of vehicle air conditioner that reduces the odor in the vehicle interior by drying the evaporator core by operating the air conditioner blower according to a certain condition of the vehicle after vehicle ignition-off (OFF).

An after-blow control method of vehicle air conditioner according to an exemplary form of the present disclosure includes turning on after-blow function applied to the vehicle and turning off the vehicle ignition, determining, by the controller, whether a condition of the vehicle is satisfied, displaying an after-blower symbol after ignition is turned off if it is determined that the condition of the vehicle is satisfied, determining, by the controller, whether a preset first time has elapsed after the vehicle is turned off, operating the after-blow at a preset intensity for a second preset time and displaying the after-blower symbol if it is determined that the first preset time has elapsed after the vehicle is turned off, and terminating the after-blow function when the second preset time elapses or when the vehicle is turned on.

The conditions of the vehicle may be vehicle battery status, ambient temperature, and A/C operation history conditions.

The after-blow control method of vehicle air conditioner according to an exemplary form of the present disclosure may further include non-operating the after-blow if the condition of the vehicle is not satisfied or it is determined that the first preset time has not elapsed after the vehicle is turned off.

In determining whether a condition of the vehicle is satisfied, the vehicle battery status may be that the state of charge (SOC) of the vehicle battery is 70% or more, the outside temperature is 15° C. or more, and the A/C operation history is 30 seconds or more.

The first preset time and the second preset time may be each 30 minutes.

The after-blow control method of vehicle air conditioner according to another exemplary form of the present disclosure may further include, before turning on after-blow function applied to the vehicle and turning off the vehicle ignition, setting, by a driver, the after-blow operation condition, and the driver sets the first time, the second time, and the preset intensity.

The after-blow control method of vehicle air conditioner according to another exemplary form of the present disclosure may further include if it is determined that the first preset time has elapsed after the vehicle is turned off, determining, by the controller, whether the battery status of the vehicle is satisfied, setting, by the driver, whether to turn on the vehicle if it is determined that the condition of the vehicle is not satisfied, determining, by the controller, whether a blue link alarm is set if it is set to not turn on, and displaying a blower non-operation alarm through a blue link, and non-operating the after-blow if it is determined that the blue link alarm is set.

The after-blow control method of vehicle air conditioner according to another exemplary form of the present disclosure may further include, after displaying the after-blower symbol after the vehicle is turned off, switching, by the controller, to indoor air mode or outside air mode.

Switching to indoor air mode or outside air mode may be changing to the indoor air mode or the outdoor air mode by reflecting the outdoor air pollution level or the indoor fine dust level.

Turning on after-blow function applied to the vehicle and turning off the vehicle ignition may be that the after-blow function is automatically turned on according to a condition preset by the driver.

The after-blow control method of vehicle air conditioner according to another exemplary form of the present disclosure may further include, in determining, by the controller, whether a condition of the vehicle is satisfied, the conditions of the vehicle may be vehicle battery status, ambient temperature, and A/C operation history conditions, if it is determined that the vehicle battery status condition is not satisfied, determining, by the controller, whether the engine is in an ON state, operating an alternator to perform power generation control until a state of charge (SOC) of the vehicle battery reaches a predetermined level or more if it is determined that the engine is in an ON state, determining, by the controller, whether the vehicle battery status condition is satisfied after the engine is turned off, performing engine ON and alternator operation in parallel if it is determined that the vehicle battery status condition is not satisfied after the engine is turned off, and operating the after-blow function after the engine is turned off if it is determined that the vehicle battery status condition is satisfied after the engine is turned off.

The after-blow control method of vehicle air conditioner according to another exemplary form of the present disclosure may further include, the vehicle is an EV vehicle including a low voltage battery and a high voltage battery, determining, by the controller, whether a condition of a low voltage battery status of the vehicle is satisfied, supplying power from the high voltage battery to the low voltage battery if it is determined that the condition of the low voltage battery status of the vehicle is not satisfied, and operating the after-blow function if it is determined that the condition of the low voltage battery status of the vehicle is satisfied.

The after-blow control method of vehicle air conditioner according to another exemplary form of the present disclosure may further include the vehicle is an EV vehicle including a low voltage battery and a high voltage battery, determining, by the controller, whether the vehicle is being charged, determining, by the controller, whether the after-blow operation condition is satisfied if it is determined that the vehicle is being charged, immediately operating the after-blow function if it is determined that the after-blow operation condition is satisfied, and non-operating the after-blow function if it is determined that the vehicle is not charging or does not satisfy the after-blow operation condition.

The after-blow control method of vehicle air conditioner according to another exemplary form of the present disclosure may further include, if it is determined that the condition of the vehicle is not satisfied, transmitting the after-blow function operating condition and a non-operating state to a driver via a remote device application (e.g., a blue link), determining, by the controller, whether a driver inputs the after-blow function operation through a blue link, determining whether the vehicle battery status condition is satisfied if it is determined that the operation of the after-blow function is input by the driver, operating the after-blow function and notifying an operation state through a blue link if it is determined that the condition of the vehicle is satisfied, and turning on the vehicle ignition if it is determined that the condition of the vehicle is not satisfied.

As described above, according to the present disclosure, by providing a function to reduce odor by drying the condensate generated on the surface of the evaporator core when the air conditioner is operating, it can contribute to increase the convenience of vehicle use and improve the marketability.

Further, by detecting the history of using A/C while driving, the after-blower is operated after a certain period of time when the remaining amount of the vehicle battery is sufficient when the vehicle is turned off, thereby reducing residual condensate in the air conditioner, thereby reducing the air conditioner odor.

Further, a battery for an after-blower motor is not separately provided, and a cost reduction effect is provided by connecting to a vehicle battery to operate the after-blower.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

Further, in exemplary forms, since like reference numerals designate like elements having the same configuration, a first exemplary form is representatively described, and in other exemplary forms, only configurations different from the first exemplary form will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary form of the present disclosure shows an exemplary form of the present disclosure in detail. As a result, various modifications of the drawings will be expected. Therefore, the exemplary form is not limited to a specific aspect of the illustrated region, and for example, includes modifications of an aspect by manufacturing.

Now, an apparatus of multi-air mode for vehicle air conditioner according to an exemplary form of the present disclosure will be described with reference to attached drawings.

Figure 1:
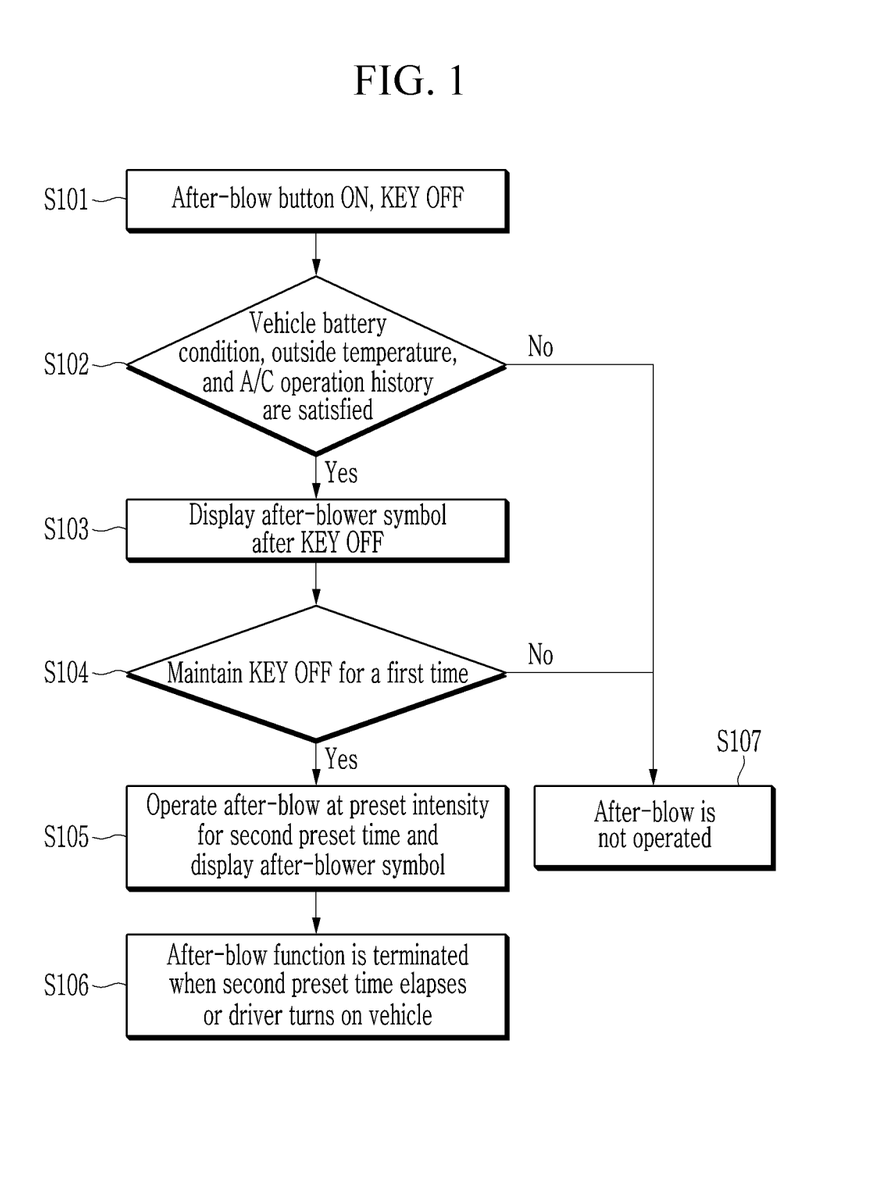
FIG. 1 is a flowchart illustrating an after-blow control method of vehicle air conditioner according to an exemplary form of the present disclosure.

FIG. 1 is a flowchart illustrating an after-blow control method of vehicle air conditioner according to an exemplary form of the present disclosure.

Figure 8:
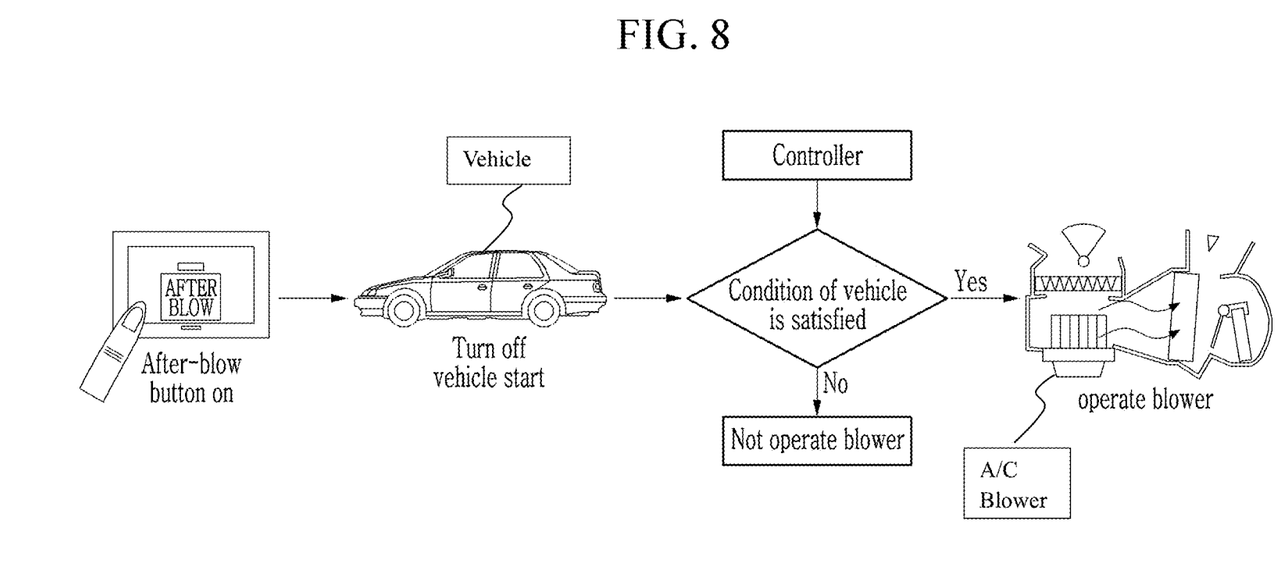
FIG. 8 is a schematic diagram illustrating the after-blow control method of a vehicle air conditioner according to the present disclosure.

Referring to FIGS. 1 and 8, FIG. 1 is a flow chart of operating the after-blow when the driver finishes driving after turning on the after-blow button and turns off the engine and meets certain conditions. FIG. 8 schematically illustrates the operation of the after-blow control of a vehicle air conditioner. First, the driver turns on the after-blow function applied to the vehicle and turns off the vehicle's ignition S101.

Then, by the controller, it is determined whether the vehicle battery condition, the outside temperature, and the condition of the air conditioner (A/C) operation history are satisfied S102. As for the vehicle battery status, the condition is satisfied when the SOC of the vehicle battery is about 70%, the outside temperature is about 15° C. or more, and the A/C operation history is about 30 seconds or more.

In this case, the controller may be implemented by one or more processors operating according to a set program, and the set program may be programmed to perform each step of the after-blow control method of vehicle air conditioner according to an exemplary form of the present disclosure.

Thereafter, if it is determined that the vehicle battery state, the outside temperature, and the A/C operation history conditions are satisfied, the after-blower symbol is displayed after starting off (OFF) S103 (e.g., turning off an engine start switch). The after-blower symbol can be displayed through an in-vehicle display device.

Then, by the controller, it is determined whether or not a preset first time has elapsed after the vehicle is turned off S104. In this case, the first preset time may be about 30 minutes.

If it is determined that the first preset time has elapsed after the vehicle is turned off, the after-blow is operated at the preset intensity for the second preset time and the after-blower symbol is displayed S105. In this case, the second preset time may be about 30 minutes. Also, the preset intensity may be set to 3 out of 8 stages.

When the second preset time elapses or the driver turns on the vehicle, the after-blow function is terminated S106.

On the other hand, if the vehicle battery condition, ambient temperature, and A/C operation history conditions are not satisfied, or if it is determined by the controller that the preset first time has not elapsed after the vehicle is turned off, the after-blow is not operated S107.

Figure 2:
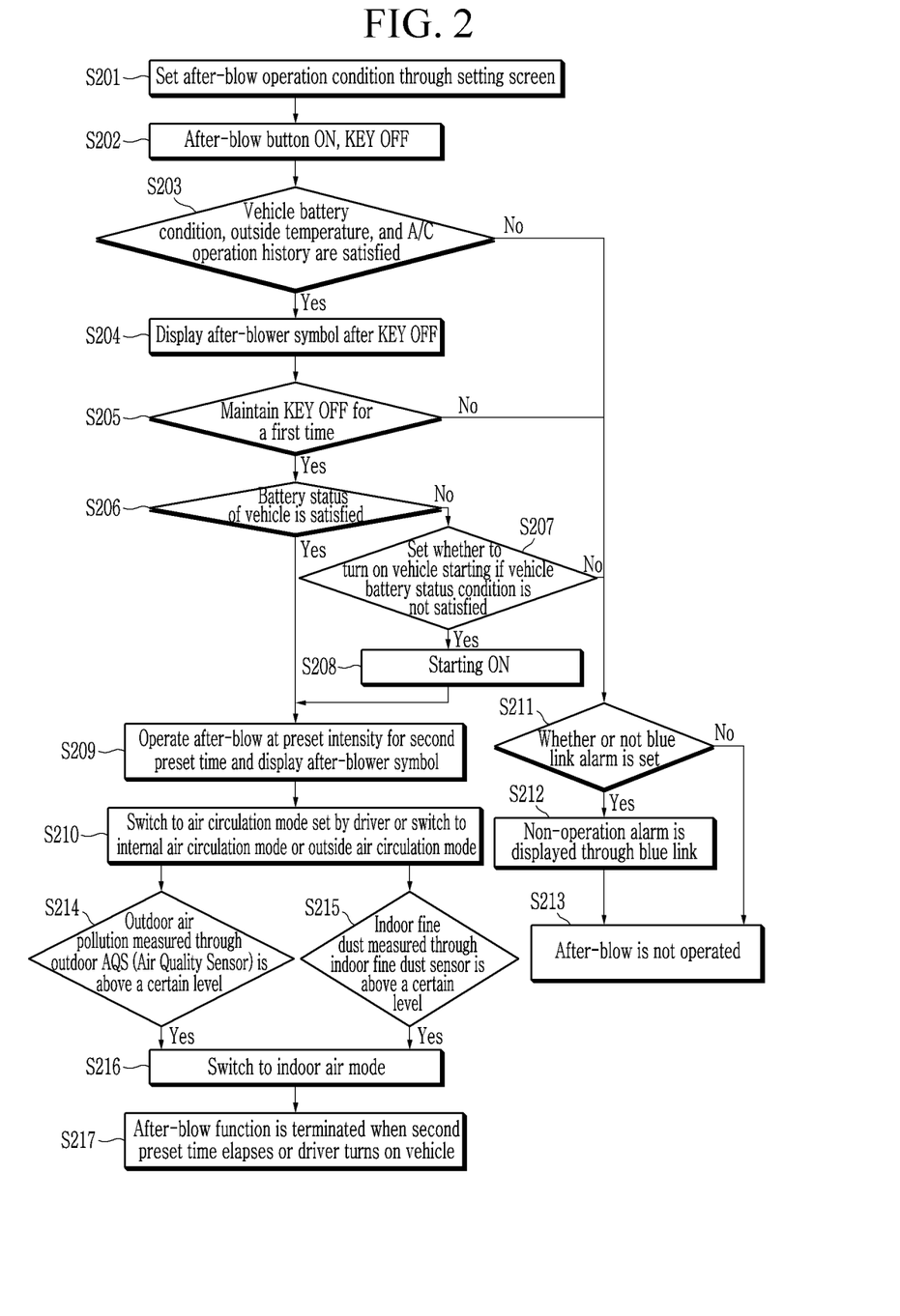
FIG. 2 is a flowchart illustrating an after-blow control method of vehicle air conditioner according to another exemplary form of the present disclosure.

FIG. 2 is a flowchart illustrating an after-blow control method of vehicle air conditioner according to another exemplary form of the present disclosure.

FIG. 2 is a flow chart in which a driver turns on the after-blow function applied to the vehicle, and before the step of turning off the vehicle, the driver sets an after-blow operation condition in advance through an air conditioner control unit and operates after-blow when a certain condition is satisfied.

Referring to FIG. 2, first, a driver sets an after-blow operation condition S201. After-blow operation conditions may be, for example, after-blow operation start time after start-off (OFF), setting the operation hold time, operation strength, discharge mode during operation, whether it always works every time the ignition is off, whether to charge the battery and turn on start-up when battery operating conditions are not satisfied, and whether Blue Link is notified when after-blow does not work.

After that, the driver turns on the after-blow function applied to the vehicle and turns off the vehicle ignition S202.

Then, by the controller, it is determined whether the vehicle battery condition, the outside temperature, and the A/C operation history conditions are satisfied S203.

Thereafter, when it is determined that the vehicle battery state, the outside temperature, and the A/C operation history conditions are satisfied, the after-blower symbol is displayed after ignition off (OFF) S204.

Then, by the controller, it is determined whether or not a preset first time has elapsed after the vehicle is turned off S205.

After that, if it is determined that the first preset time has elapsed, it is determined by the controller whether the battery status of the vehicle is satisfied S206. In this case, the first preset time may be about 30 minutes.

If it is determined that the vehicle battery status condition is not satisfied, the driver sets whether to turn on the vehicle starting S207.

If the driver sets the vehicle to not turn on, the controller determines whether or not the blue link alarm is set S211.

And, if it is determined that the blue link alarm has been set, non-operation alarm is displayed through the blue link S212, and after-blow is not operated S213.

If it is determined that the vehicle battery status condition is not satisfied, the after-blow is operated at a preset intensity for a second preset time and the after-blower symbol is displayed S209. In this case, the second preset time may be about 30 minutes. Also, the preset intensity may be set to 3 out of 8 stages.

After that, by the controller, it switches to the air circulation mode set by the driver or switches to the internal air circulation mode or the outside air circulation mode S210. In this case, the indoor air circulation mode or the outdoor air circulation mode may be switched by reflecting the outdoor air pollution level or the indoor fine dust level.

At this time, it is possible to switch to the outdoor air mode to remove condensate and reduce indoor humidity. However, when the outdoor air pollution measured through the outdoor AQS (Air Quality Sensor) is above a certain level S214 or the indoor fine dust measured through the indoor fine dust sensor is above a certain level S215, by switching to indoor air mode, the indoor pollution level is stabilized first S216.

After that, when a second preset time elapses or when the driver turns on the vehicle, the after-blow function is terminated S217.

Figure 3:
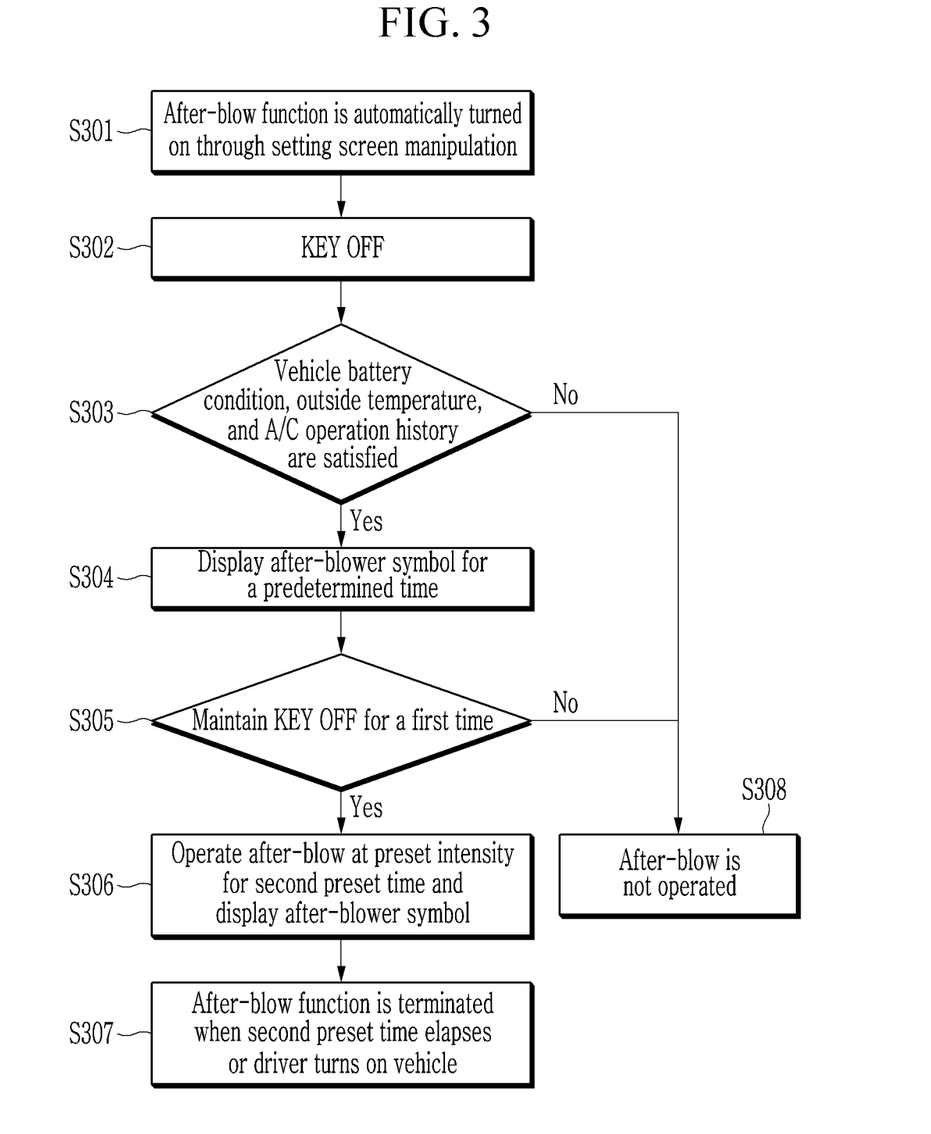
FIG. 3 is a flowchart illustrating an after-blow control method of vehicle air conditioner according to another exemplary form of the present disclosure.

FIG. 3 is a flowchart illustrating an after-blow control method of vehicle air conditioner according to another exemplary form of the present disclosure.

FIG. 3 is a flowchart illustrating a case in which the after-blow function is set to operate automatically when certain conditions are satisfied through a setting screen operation of the air conditioner operation unit when a separate after-blow button is not provided on the control unit of the in-vehicle air conditioner.

Referring to FIG. 3, first, the after-blow function is automatically turned on according to a condition previously set by the driver through a setting screen manipulation S301. At this time, the preset conditions may be time, indoor air pollution degree, indoor fine dust level, and the like.

After turning off the ignition S302, it is determined by the controller whether the vehicle battery state, the outside temperature, and the A/C operation history conditions are satisfied S303.

Then, when it is determined that the vehicle battery state, the outside temperature, and the A/C operation history conditions are satisfied, the after-blower symbol is displayed for a predetermined time S304.

Then, by the controller, it is determined whether or not a preset first time has elapsed after the vehicle is turned off S305. In this case, the first preset time may be about 30 minutes.

Then, if it is determined that the first preset time has elapsed, the after-blow is operated at the preset intensity for the second preset time and the after-blower symbol is displayed S306. In this case, the second preset time may be about 30 minutes. Also, the preset intensity may be set to 3 out of 8 stages.

If the second preset time elapses or the driver turns on the vehicle, the after-blow function is terminated S307.

On the other hand, if the vehicle battery condition, ambient temperature, and A/C operation history conditions are not satisfied, or if it is determined by the controller that the preset first time has not elapsed after the vehicle is turned off, the after-blow is not operated S308.

Figure 4:
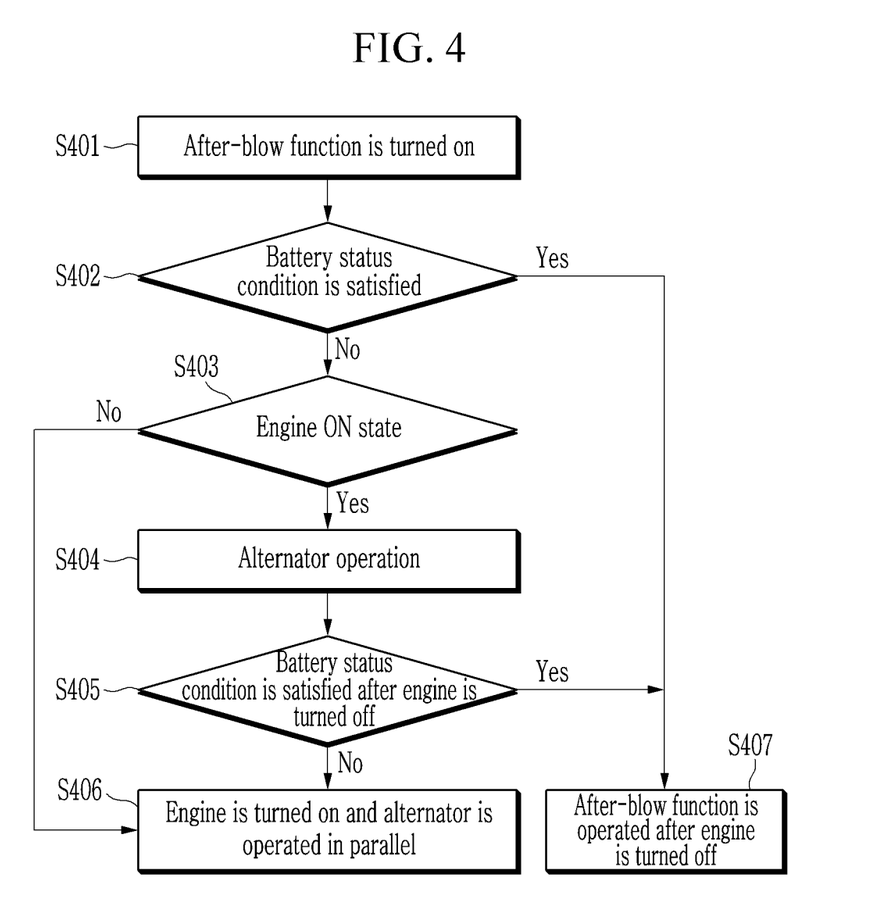
FIG. 4 is a flowchart illustrating an after-blow control method of vehicle air conditioner according to another exemplary form of the present disclosure.

FIG. 4 is a flowchart illustrating an after-blow control method of vehicle air conditioner according to another exemplary form of the present disclosure.

FIG. 4 is a flowchart illustrating an after-blow function in the case of an internal combustion engine vehicle being turned on while driving, and operating the after-blow according to the amount of battery charge.

Referring to FIG. 4, first, the after-blow function setting is turned on S401, and it is determined by the controller whether the battery status condition is satisfied S402.

If the vehicle battery status condition is not satisfied, it is determined by the controller whether the engine is in an ON state S403. If the vehicle battery status condition is satisfied, the after-blow function is operated after the engine is turned off S407.

If it is determined that the engine is in the ON state, the controller operates the alternator to perform power generation control until the SOC of the vehicle battery reaches a certain level or higher S404.

Then, after the engine is turned off, the controller determines whether the vehicle battery status condition is satisfied S405. At this time, if the vehicle battery status condition is not satisfied, the engine is turned on and the alternator is operated in parallel S406, and if the vehicle battery status condition is satisfied, the after-blow function is operated after the engine is turned off S407.

Figure 5:
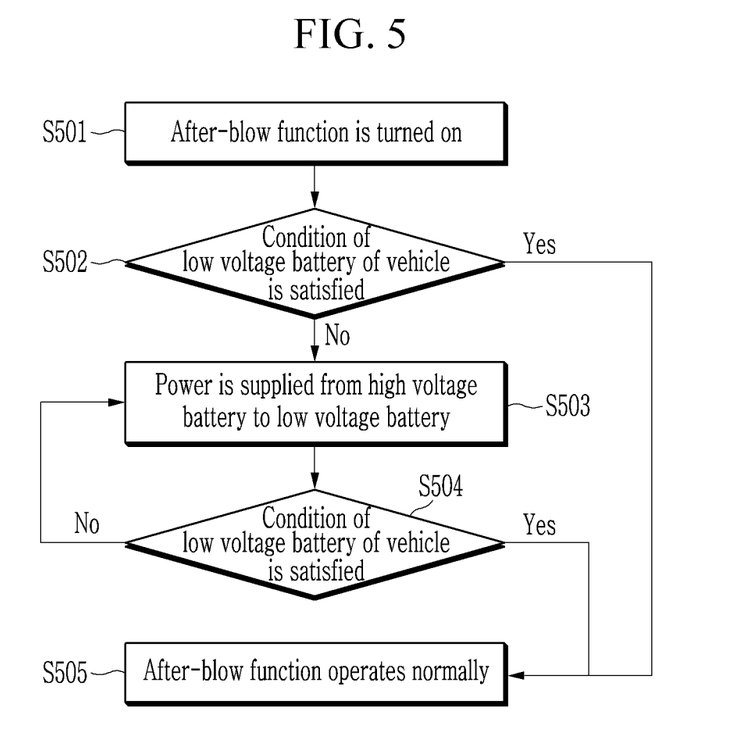
FIG. 5 is a flowchart illustrating an after-blow control method of vehicle air conditioner according to another exemplary form of the present disclosure.

FIG. 5 is a flowchart illustrating an after-blow control method of vehicle air conditioner according to another exemplary form of the present disclosure.

FIG. 5 is a flowchart illustrating an operation of an after-blow according to a battery charge amount operated by a blower motor in the case of an electric vehicle (EV) including a low voltage battery and a high voltage battery.

Referring to FIG. 5, first, after-blow function setting is turned on, it is determined by the controller whether the condition of the low voltage battery of the vehicle is satisfied S502.

When the condition of the vehicle's low voltage battery is not satisfied, power is supplied from the high voltage battery to the low voltage battery S503.

When the condition of the vehicle's low voltage battery is satisfied, the after-blow function operates normally S505.

Figure 6:
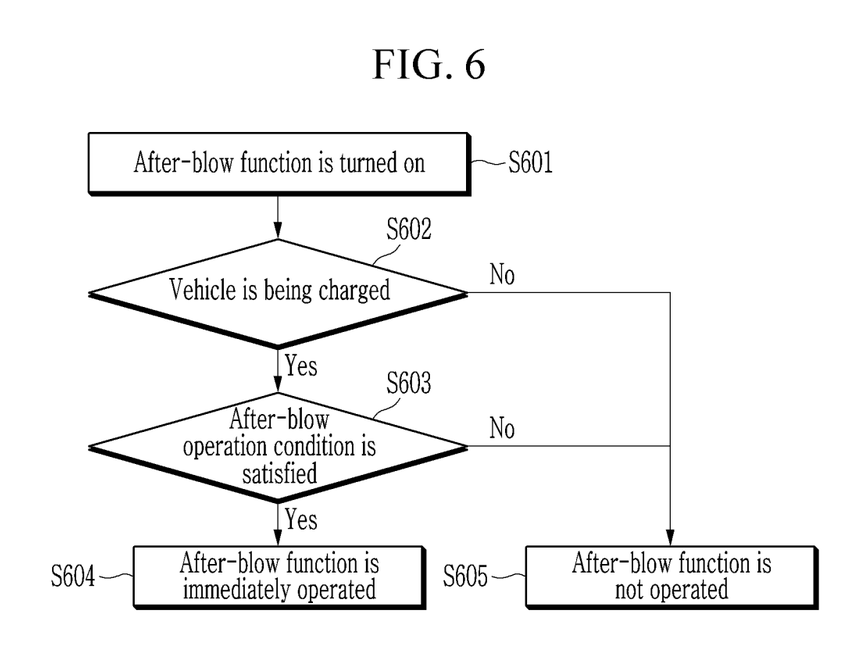
FIG. 6 is a flowchart illustrating an after-blow control method of vehicle air conditioner according to another exemplary form of the present disclosure.

FIG. 6 is a flowchart illustrating an after-blow control method of vehicle air conditioner according to another exemplary form of the present disclosure.

FIG. 6 is a flowchart of operating after-blow when the electric vehicle EV is in a charging state.

Referring to FIG. 6, first, the after-blow function setting is turned on S601, and it is determined whether the vehicle is being charged by the controller S602.

If it is determined that the vehicle is being charged, it is determined by the controller whether the after-blow operation condition is satisfied S603. As for the after-blow operation condition, the conditions in the above-described forms may be applied.

If it is determined that the after-blow operation condition is satisfied, the after-blow function is immediately operated S604, and if it is determined that the vehicle is not charging or does not satisfy the after-blow operation condition, the after-blow function is not operated S605.

Figure 7:
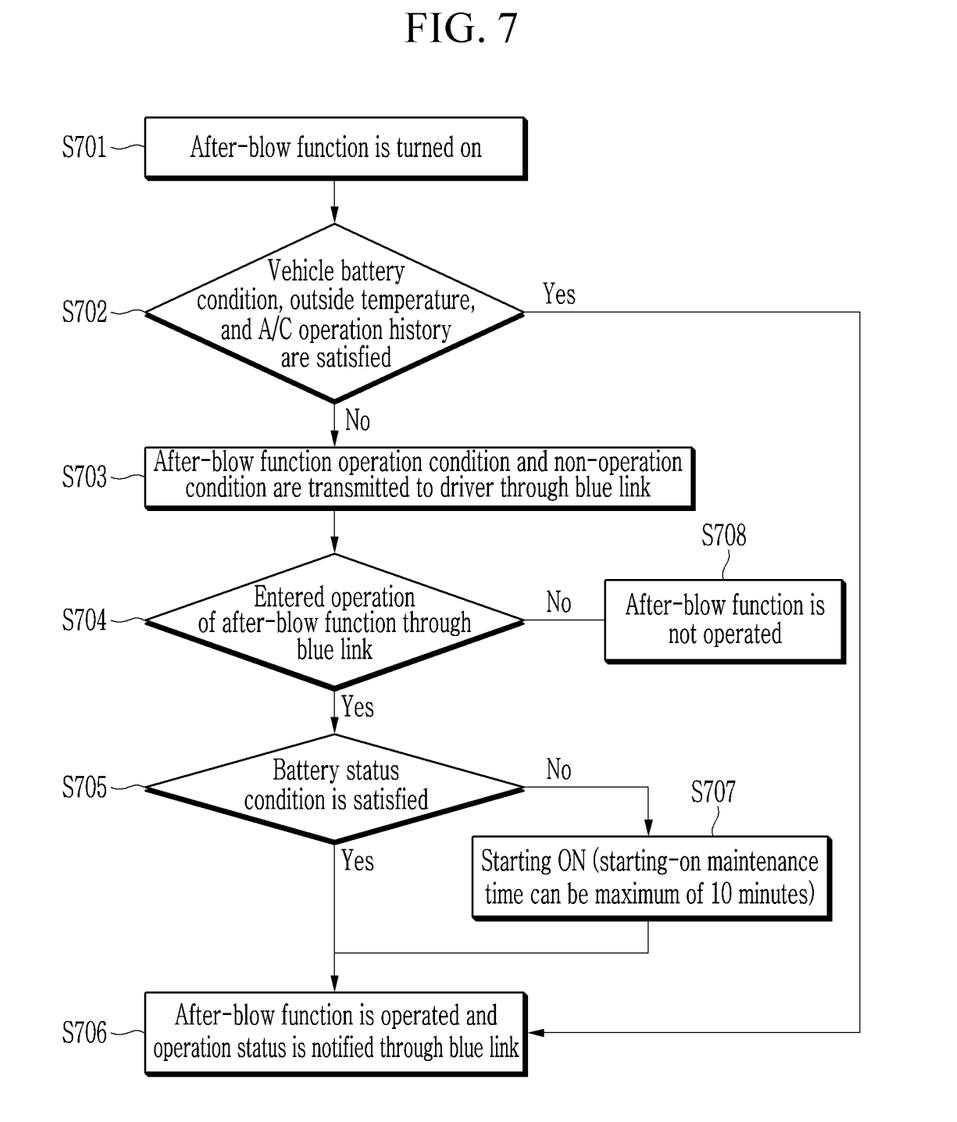
FIG. 7 is a flowchart illustrating an after-blow control method of vehicle air conditioner according to another exemplary form of the present disclosure.

FIG. 7 is a flowchart illustrating an after-blow control method of vehicle air conditioner according to another exemplary form of the present disclosure.

FIG. 7 is a flow chart in which the driver sets an after-blow operation condition in advance and, when the after-blow operation condition is not satisfied, receives an operation approval signal by a separate operation of the driver to operate the after-blow.

First, after the after-blow function setting is turned on S701 and the start is turned off (OFF), it is determined by the controller whether the vehicle battery status, the outside temperature, and the A/C operation history conditions are satisfied S702.

Then, when it is determined that the vehicle battery state, the outside temperature, and the A/C operation history conditions are satisfied, the after-blow function is operated and the operation state is notified through the blue link S706.

If it is determined that the vehicle battery state, the outside temperature, and the A/C operation history conditions are not satisfied, the after-blow function operation condition and the non-operation condition are transmitted to the driver through the blue link S703.

Then, by the controller, it is determined whether or not the driver has entered the operation of the after-blow function through the blue link S704.

If it is determined that the operation of the after-blow function is input by the driver, it is determined by the controller whether the vehicle battery status condition is satisfied S705. If it is determined by the driver that the operation of the after-blow function has not been input, the after-blow function is not operated S708.

If it is determined that the vehicle battery status condition is satisfied, the after-blow function is operated and the operation status is notified through the blue link S706.

If it is determined that the vehicle battery status condition is not satisfied, the vehicle start is turned on S707. At this time, the start-on maintenance time can be set to a maximum of about 10 minutes.

As described above, according to the present disclosure, by providing a function to reduce odor by drying the condensate generated on the surface of the evaporator core when the air conditioner is operating, it can contribute to increase the convenience of vehicle use and improve the marketability.

Further, by detecting the history of using A/C while driving, the after-blower is operated after a certain period of time when the remaining amount of the vehicle battery is sufficient when the vehicle is turned off, thereby reducing residual condensate in the air conditioner, thereby reducing the air conditioner odor.

Further, a battery for an after-blower motor is not separately provided, and a cost reduction effect is provided by connecting to a vehicle battery to operate the after-blower.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. An after-blow control method for an air conditioner of a vehicle, the after-blow control method comprising:
   turning on an after-blow function applied to the vehicle and turning off an ignition of the vehicle;
   determining, by a controller, whether an operation condition of the after-blow function is satisfied, wherein the operation condition of the after-blow function includes a battery status condition of the vehicle, an ambient air temperature outside of the vehicle, and an operation history of the air conditioner;
   displaying an after-blower symbol after the ignition of the vehicle is turned off based on a determination that the operation condition of the after-blow function is satisfied;
   determining, by the controller, whether a first preset time has elapsed after the ignition of the vehicle is turned off;
   operating, by the controller, the after-blow function at a preset intensity for a second preset time and displaying the after-blower symbol based on a determination that the first preset time has elapsed after the ignition of the vehicle is turned off;
   terminating, by the controller, the after-blow function based on a determination that the second preset time has elapsed or the ignition of the vehicle is turned on;
   determining, by the controller, whether an engine of the vehicle is in an ON state based on a determination that the battery status condition is not satisfied;
   operating, by the controller, an alternator to generate an electric power until a state of charge (SOC) of a battery of the vehicle reaches a predetermined level or more based on a determination that the engine is in the ON state;
   determining, by the controller, whether the battery status condition is satisfied after the engine is turned off;
   turning on the engine and operating the alternator based on a determination that the battery status condition is not satisfied after the engine is turned off; and
   operating the after-blow function based on a determination that the battery status condition is satisfied after the engine is turned off,
   wherein:
   the after-blow function is automatically turned on according to a condition preset by a driver of the vehicle.

2. The after-blow control method of claim 1, further comprising:
   not operating the after-blow function based on a determination that the operation condition of the after-blow function is not satisfied or the first preset time has not elapsed after the ignition of the vehicle is turned off.

3. The after-blow control method of claim 1, wherein:
   The operation condition of the after-blow function is satisfied when the SOC of the battery is equal to or greater than 70%, the ambient air temperature is equal to or greater than 15° C., and the operation history of the air conditioner is equal to or greater than 30 seconds.

4. The after-blow control method of claim 1, wherein:
   the first preset time and the second preset time are each 30 minutes.

5. The after-blow control method of claim 1, further comprising:
   before turning on the after-blow function and turning off the ignition of the vehicle,
   setting, by the driver, the operation condition of the after-blow function, the first preset time, the second preset time, and the preset intensity.

6. The after-blow control method of claim 5, further comprising:
   determining, by the controller, whether the battery status condition of the vehicle is satisfied based on a determination that the first preset time has elapsed after the ignition of the vehicle is turned off;
   setting, by the driver, whether to turn on the ignition of the vehicle based on a determination that the battery status condition of the vehicle is not satisfied;
   determining, by the controller, whether an alarm via a remote device application is set based on a determination that the ignition of the vehicle is set to not turn on; and
   displaying a blower non-operation alarm through the remote device application, and not operating the after-blower function as the alarm is set.

7. The after-blow control method of claim 6, further comprising:
   after displaying the after-blower symbol after the ignition of the vehicle is turned off, switching, by the controller, to an indoor air mode or an outside air mode of the air conditioner.

8. The after-blow control method of claim 7, wherein:
   switching to the indoor air mode or the outside air mode is determined based on a level of outdoor air pollution or a level of indoor fine dust.

9. The after-blow control method of claim 1, further comprising:
   in response to determining that the operation condition of the after-blow function is not satisfied,
   transmitting the operation condition of the after-blow function and a non-operating state to the driver via a remote device application;
   determining, by the controller, whether there is an input from the driver to operate the after-blow function through the remote device application;
   determining whether the battery status condition is satisfied based on a determination that there is the input from the driver;
   operating the after-blow function and notifying an operation state through the remote device application based on a determination that the battery status condition is satisfied; and
   turning on the ignition of the vehicle based on a determination that the battery status condition is not satisfied.

* * * * *